United States Patent
Caushi (10) Patent No.: US 9,783,158 B2
(45) Date of Patent: Oct. 10, 2017

(54) SYSTEM AND METHOD FOR ON-DEMAND PASSIVE ENTRY DISABLE

(71) Applicant: Ford Global Technologies, LLC, Dearborn, MI (US)

(72) Inventor: Aldi Caushi, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 14/924,489

(22) Filed: Oct. 27, 2015

(65) Prior Publication Data

US 2017/0113650 A1    Apr. 27, 2017

(51) Int. Cl.
*B60R 25/01* (2013.01)
*B60R 25/20* (2013.01)
*G07C 9/00* (2006.01)

(52) U.S. Cl.
CPC ............ *B60R 25/01* (2013.01); *B60R 25/209* (2013.01); *G07C 9/00658* (2013.01)

(58) Field of Classification Search
CPC ...... G07C 2009/00555; G07C 9/00309; G07C 2009/00984; G07C 9/00126; G07C 2009/00468; G07C 2209/08; B60R 25/00; B60R 25/01; B60R 25/20; B60R 25/2072; B60R 2325/105; B60R 2325/205; B60R 25/04
USPC .................. 340/5.1, 5.2, 5.6, 5.7, 5.61, 5.72
See application file for complete search history.

(56) References Cited

U.S. PATENT DOCUMENTS

| | | | |
|---|---|---|---|
| 8,451,089 B2 | 5/2013 | Hilgers et al. | |
| 8,587,403 B2 | 11/2013 | Ghabra et al. | |
| 8,930,045 B2 | 1/2015 | Oman et al. | |
| 2006/0255906 A1* | 11/2006 | Ghabra | B60R 25/24 340/5.25 |
| 2007/0069870 A1 | 3/2007 | Strumolo | |
| 2014/0375420 A1 | 12/2014 | Seiberts et al. | |
| 2016/0082975 A1* | 3/2016 | Lovett | H04L 67/10 701/2 |

FOREIGN PATENT DOCUMENTS

| | | |
|---|---|---|
| EP | 3121069 A | 1/2017 |
| GB | 2426102 A | 11/2006 |
| GB | 2494398 A | 3/2013 |

OTHER PUBLICATIONS

Search Report dated Jun. 15, 2017 for GB Patent Application No. GB1618068.9.

* cited by examiner

*Primary Examiner* — Yong Hang Jiang
(74) *Attorney, Agent, or Firm* — James P. Muraff; Neal Gerber & Eisenberg LLP (57) ABSTRACT

Various embodiment of the present disclosure provide a system and method for disabling a passive entry passive start system (PEPS) of a vehicle. In one embodiment, the system and method of the present disclosure enable a user of the vehicle to disable the standard PEPS operations so that the vehicle control module will not unlock the vehicle or automatically start the vehicle as it would under standard operation.

20 Claims, 6 Drawing Sheets

SYSTEM AND METHOD FOR ON-DEMAND PASSIVE ENTRY DISABLE

TECHNICAL FIELD

This application generally relates to a system and method for remotely disabling a passive entry system of a vehicle to prevent unauthorized unlocking and starting of the vehicle.

BACKGROUND

Intelligent Access (IA) system for vehicles is a system that enables vehicle entry and start capabilities without any action from the user if the user has a valid key fob. IA systems are also known as passive entry pass starts (PEPS) systems. A remote keyless system (RKS), enables access to the vehicle, without using a traditional key or other mechanical device, or otherwise making physical contact with the vehicle. Typically, remote keyless systems include a remote control comprising buttons or switches for enabling control of vehicle functions. The remote control may be in the form of an independent key fob separate from an ignition key of the vehicle, or a key fob built into the ignition key handle. Conventional remote keyless systems typically include a remote keyless entry (RKE) system for enabling remote, keyless control of the vehicle's doors, including, for example, locking and unlocking the door locks or other electronic locks in the vehicle, opening and/or closing the trunk, tailgate, sliding doors, or other electronically-operated doors. Typically, the key fob includes a lock button for locking all vehicle doors and an unlock button for unlocking one or more of the vehicle doors.

Conventional remote keyless systems can also include a remote keyless ignition (RKI) system for enabling remote, keyless start of the vehicle's engine. In such cases, the key fob includes a remote start function for start the vehicle to condition the cabin of the vehicle and a panic button for activating the vehicle's alarm system. An unauthorized user may use such conveniences to open and start the vehicle.

To prevent unauthorized access, customers may purchase aftermarket metal products (i.e., Faraday Shields) that shield the passive key (PK) fob from any unauthorized radio frequency (RF) signals. In addition to the added expense of such aftermarket products, another drawback is the inconvenience of this approach as the customer must remove the passive key out of this protective pouch each time to unlock or start the vehicle.

Accordingly, there is still a need in the art for a passive entry disabling system and method to prevent unauthorized unlock and start of the vehicle.

SUMMARY

Various embodiments of the present disclosure include a system and method for disabling a passive entry system by temporarily disabling the passive entry passive start (PEPS) capabilities of a vehicle to prevent unauthorized access.

More specifically, various embodiments of the present disclosure provide a system and method to prevent unauthorized unlocking and starting of a vehicle with passive entry passive start (PEPS) capabilities by activating a passive entry disabling feature. The passive entry disabling feature includes switching from a standard PEPS operation mode to a restricted PEPS operation mode under which the vehicle control module will not unlock the vehicle or automatically start the vehicle as it would under standard operation. Under the restricted PEPS operation mode, the vehicle computing system (VCS) ignores unauthorized commands for passive entry or passive start.

In one embodiment, a user must have a valid key to enable passive entry disabling feature and initiate the restricted PEPS operation mode. After validation the vehicle will configure the vehicle body control module to operate in restricted PEPS operation mode and will communicate the next steps to the user through the vehicle human to machine interface (HMI). The passive entry disabling feature may be configured to be activated manually (or on-demand) or automatically. When the passive entry disabling feature is configured to automatic activation mode, the vehicle rejects any entry or start commands within a predetermined time period after locking the vehicle. When the passive entry disabling feature is configured to manual or on-demand activation mode, the vehicle rejects any entry or start commands immediately after the vehicle body control module receives a valid activation command. The activation command is received at the vehicle body control module from a passive key and keypad by either a separate button/switch or a combination of current buttons. Such a configuration prevents any unauthorized user to send any false signals and gain unauthorized access to the vehicle.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Under standard PEPS operation, when a user sends a command signal (i.e., unlock command signal) from a key fob or a keypad of a vehicle door, the vehicle body control module receives the signal and begins to send low frequency queries for the passive entry or passive start throughout the various antennas along the vehicle body. Upon detection of a signal from the key fob or keypad, the vehicle body control module responds to the user's command signal by completing the command (i.e., unlocking the vehicle). It should be appreciated, that under certain circumstances, an unauthorized user may be able to relay a signal from a key fob or keypad, which the vehicle body control module would detect and respond to.

More specifically, various embodiments of the present disclosure provide a system and method to prevent unauthorized unlocking and starting of a vehicle with passive entry passive start (PEPS) capabilities by activating a passive entry disabling feature. The passive entry disabling feature includes switching from a standard PEPS operation mode to a restricted PEPS operation mode under which the vehicle control module will not unlock the vehicle or automatically start the vehicle as it would under standard operation. Under the restricted PEPS operation mode, the vehicle computing system (VCS) ignores unauthorized commands for passive entry or passive start.

In one embodiment, a user must have a valid key to enable passive entry disabling feature and initiate the restricted PEPS operation mode. After validation the vehicle will configure the vehicle body control module to operate in restricted PEPS operation mode and will communicate the next steps to the user through the vehicle human to machine interface (HMI). The passive entry disabling feature may be configured to be activated manually (or on-demand) or automatically. When the passive entry disabling feature is configured to automatic activation mode, the vehicle rejects any entry or start commands within a predetermined time period after locking the vehicle. When the passive entry disabling feature is configured to manual or on-demand activation mode, the vehicle rejects any entry or start commands immediately after the vehicle body control module receives a valid activation command. The activation command is received at the vehicle body control module from a passive key and keypad by either a separate button/switch or a combination of current buttons. Such a configuration prevents any unauthorized user to send any false signals and gain unauthorized access to the vehicle.

Figure 1A:
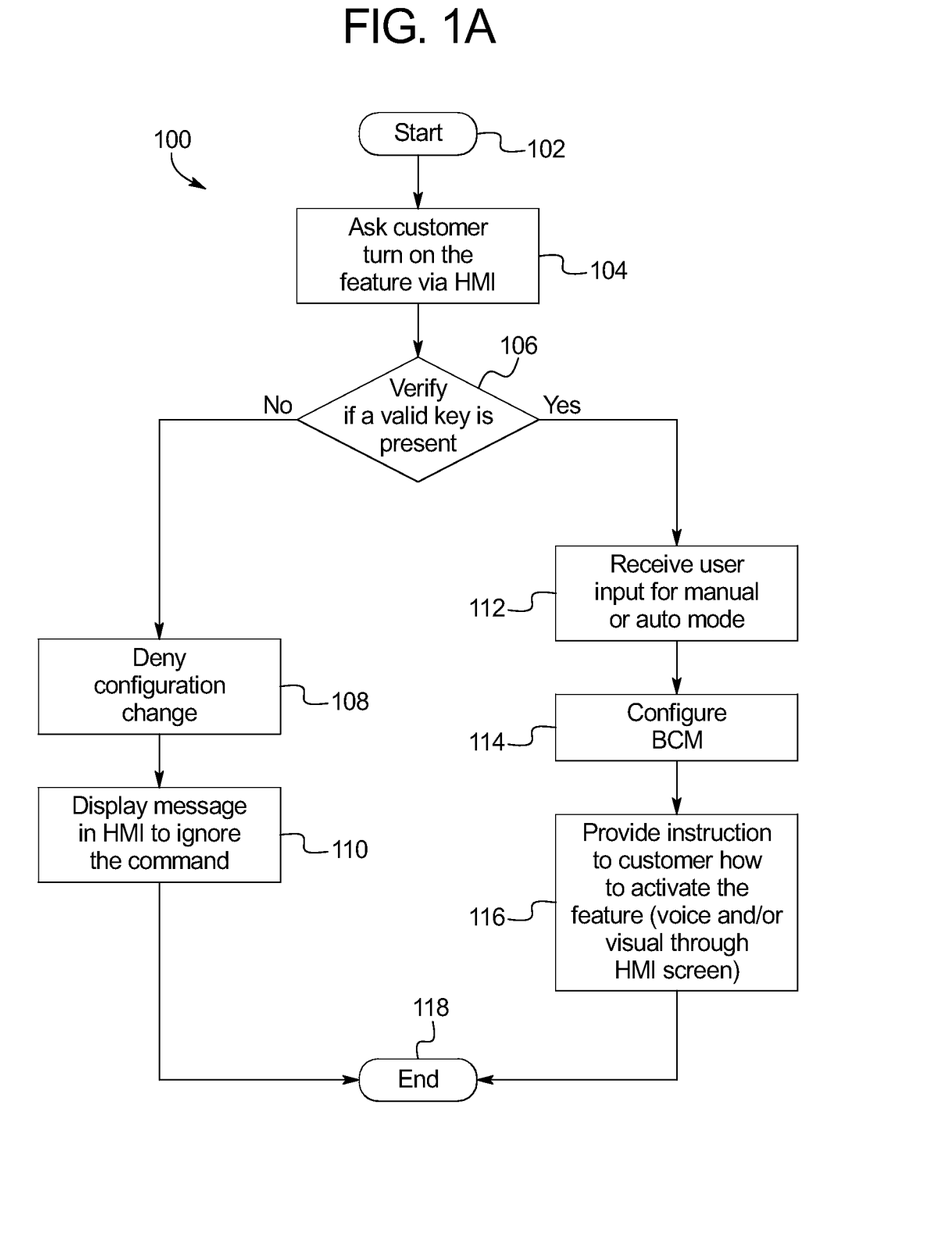
FIG. 1A is flow chart of an example process of one embodiment of the system and method of the present disclose.
Figure 1B:
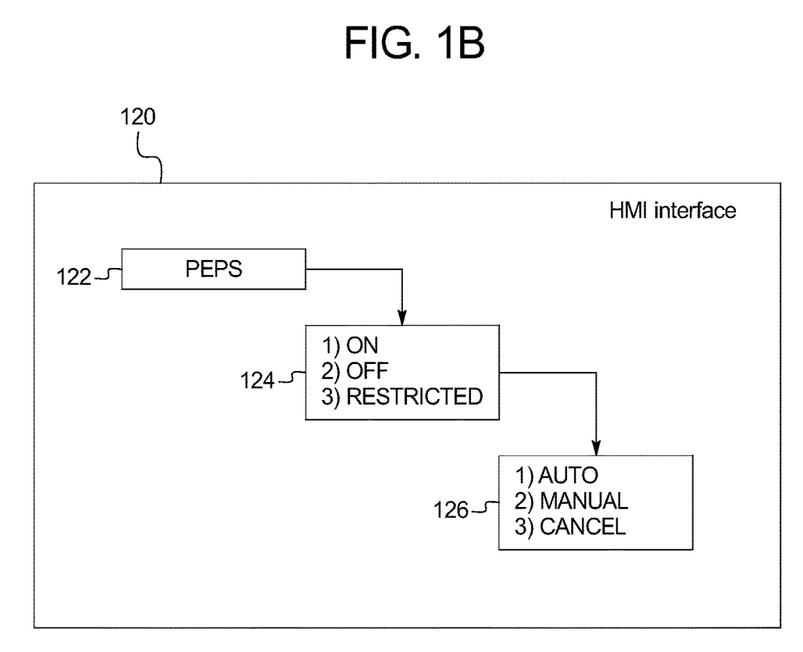
FIG. 1B is an example screenshot of a human to machine interface according to one embodiment of the present disclosure.
Figure 2:
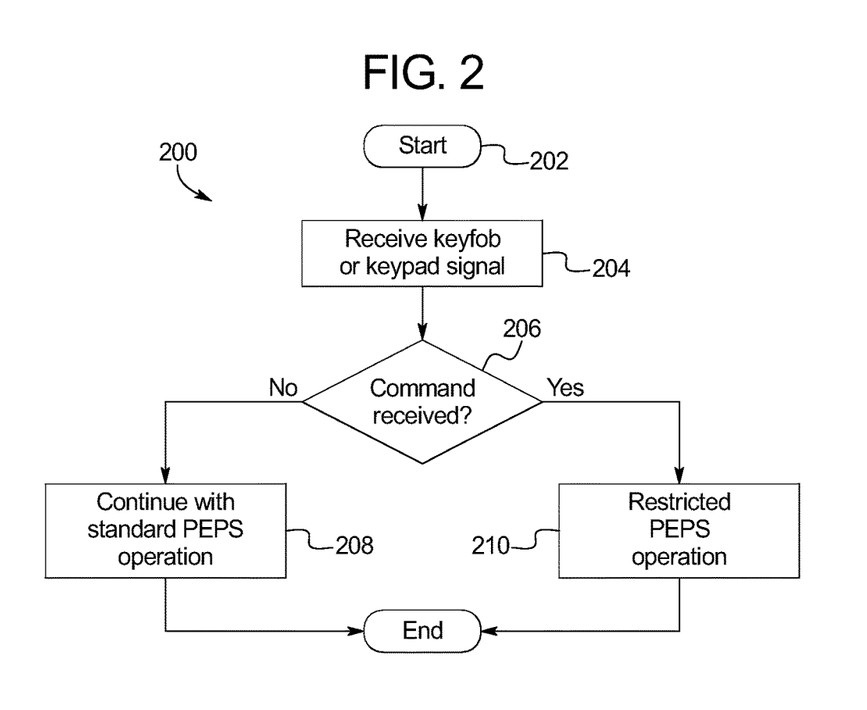
FIG. 2 is a flow chart including an example activation process of one embodiment of the system and method of the present disclosure.
Figure 3:
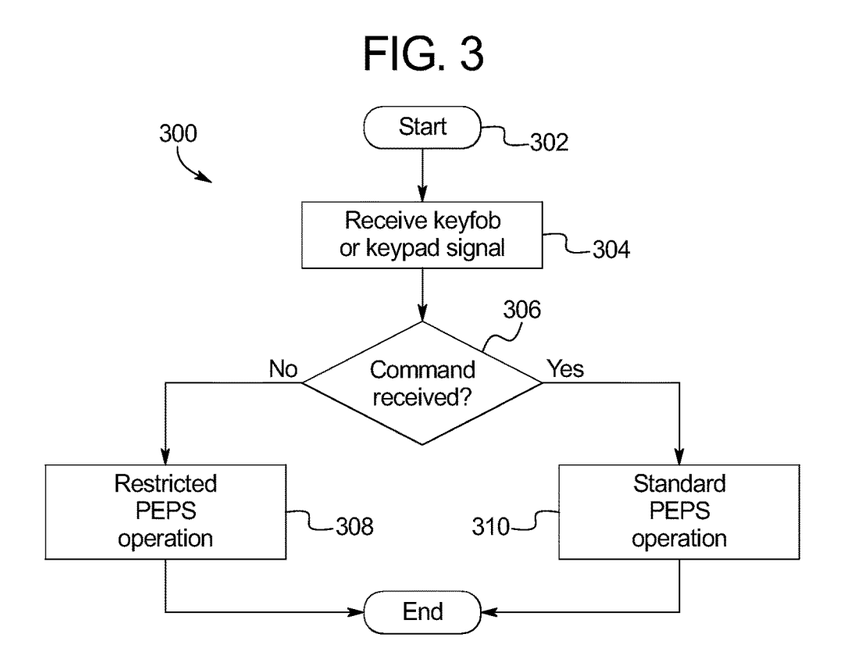
FIG. 3 is a flow chart including an example deactivation process of one embodiment of the system and method of the present disclosure.
Figure 4:
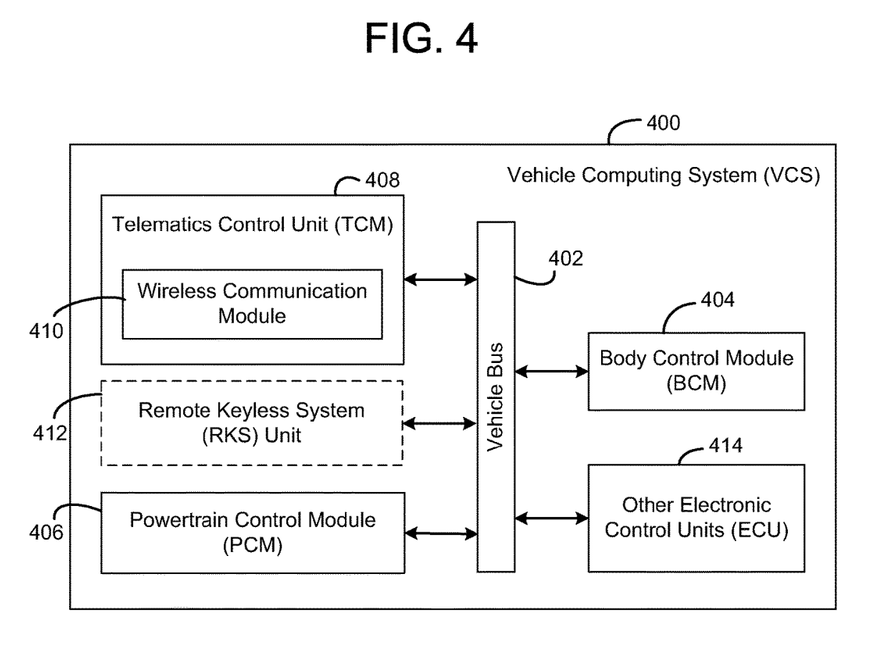
FIG. 4 is a block diagram of an example vehicle computing system included in the vehicle of the system and method of the present disclosure, in accordance with certain embodiments.
Figure 5:
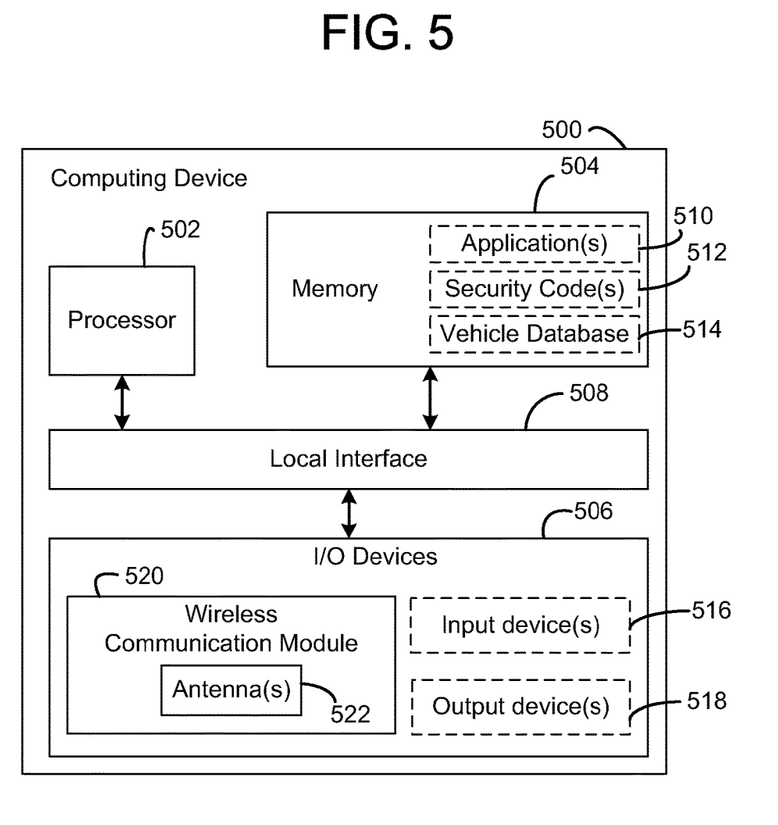
FIG. 5 is a block diagram of an example computing device included in one or more components of the system and method of the present disclosure, in accordance with certain embodiments.

FIGS. 1-3 illustrate one embodiment of a processes 100, 200, and 300 for providing a system and method for passive entry disabling in accordance with one or more principles of the invention. Various components of the system and method of the present disclosure may be implemented using software executable by one or more servers or computers, such as a computing device 500 with a processor 502 and a memory 504 as shown in FIG. 5, which is described in more detail below. It should be appreciated that the term "vehicle" as referred to hereinafter includes various components within the vehicle (such as the vehicle computing system (VCS) and the vehicle body control module (BCM) that operate to carry out the functions as described. Such components are described in greater detail below with respect to FIG. 4.

FIG. 1A illustrates the process 100 for enabling the passive entry disabling feature. Process 100 starts at step 102, when a customer wishes to initiate the restricted PEPS operation mode. More specifically, process 100 is initiated when an authorized user is inside a vehicle, and prior to getting out of the vehicle and locking the vehicle, the user is prompted to turn on the restricted PEPS operational mode, as indicated by step 104. In one embodiment, the vehicle prompts the user on a human to machine interface (HMI) in the vehicle.

FIG. 1B depicts an example of a selection menu on an HMI 120 of a vehicle. A PEPS selection button 122 opens a subsequent PEPS selection menu 124 for the PEPS operation modes: (1) "ON" which represents standard PEPS operation mode, (2) "OFF" which represents the PEPS capabilities are turned off so that no users (authorized or unauthorized) may utilize the PEPS capabilities, and (3) "RESTRICTED," which represents restricted PEPS operation mode where the authorized user of the vehicle may temporarily disable the PEPS capabilities to prevent unauthorized access to the PEPS system.

It should be appreciated that FIG. 1B is merely an illustration of one embodiment of an HMI prompt for the passive entry disabling system. The menu options described herein may be displayed in various alternate formats.

Turning back to FIG. 1A, after prompting the customer to turn on the passive entry disabling feature, the vehicle verifies whether a valid key is present, as indicated by decision diamond 106. The customer must have a valid key and this is the only way to enable and disable the PEPS restriction mode. This step is necessary to avoid inadvertent actuation.

In certain embodiments, an ECU (such as the body control module) verifies the key similarly to the verification process for vehicle entry or vehicle start. Such a configuration ensures that a valid key is present when activating this passive entry disabling feature so that the feature cannot be disabled for future activation.

If the vehicle determines that no valid key is present, the vehicle denies the configuration change to the restricted PEPS operational mode, as indicated by step 108. The vehicle displays a message on the HMI to ignore the command for restricted PEPS operational mode, as indicated by step 110. After displaying the message, the vehicle ends the process 100, as indicated by block 118.

If, on the other hand, the vehicle is able to verify a valid key at decision diamond 106, the process 100 includes prompting the user for the user's input for manual, or on-demand activation or automatic activation of the passive entry disabling feature, as indicated by step 112. Turning back to FIG. 1B, the example HMI 120 depicts the user's options. After selecting the PEPS selection button 122, and selecting option (3) for restricted mode from the subsequent PEPS selection menu 124, the user is presented with the PEPS restricted mode selection menu 126. This menu 126 presents the three options for activation and deactivation of restricted PEPS operation mode. The three options include: (1) Auto (vehicle is automatically in PEPS restriction operation mode), (2) Manual or On-Demand (activate feature with special command); and (3) CANCEL (turn PEPS restriction mode is off).

For on-demand or manual activation of the passive entry disabling system, the user sets the vehicle PEPS system to manually be switched from standard operation mode to restricted mode. In this embodiment, the vehicle accepts a signal from either the key fob or the door keypad to be switched to restricted PEPS operation mode. The user may send the signal as the user sees fit. For automatic activation of the passive entry disabling system, the vehicle automatically operates in restricted mode after the vehicle is locked. As described in greater detail below, the vehicle provides instructions for the user to set the appropriate parameters under either configuration.

After receiving the user's input choice, the vehicle configures the vehicle body control module, as indicated by block 114. It should be appreciated that the vehicle includes plurality of electronic control units that control various aspects of the vehicle. The vehicle body control module is broadly described here for controlling various components within the vehicle. Step 114 is explained in greater detail by FIGS. 2 and 3, which illustrate process 200 for activation of the passive entry disabling feature and process 300 for deactivation of the passive entry disabling feature.

The vehicle then provides instructions to the customer regarding how to activate the feature, as indicated by block 116. In one embodiment, the vehicle provides instructions visually through the vehicle HMI. In another embodiment, the vehicle provides instructions audibly through the Ford SYNC system, which is described in greater detail below with respect to FIG. 6. For manual, or on-demand mode, these instructions include describing how the user is to use the activation and deactivation commands described in greater detail with respect to FIGS. 2-3. It should be appreciated that the vehicle may provide the instructions to the user via the HMI (text or graphic) or can be included in the vehicle owner's manual.

Turning to FIG. 2, process 200 represents the passive entry disabling feature activation process when the vehicle is in the restricted PEPS mode. Process 200 starts at step 202, which resumes from step 114 of FIG. 1A. That is, after the vehicle has turned on the passive entry disabling feature (step 104), verified a valid key is present (step 106) and received a user input for manual mode (step 112), the vehicle configures the body control module (step 114) to operate in the restricted PEPS mode. Under the restricted PEPS mode, the vehicle ignores any entry and/or start signals received from a key fob or keypad. Process 200 describes the activation of this mode.

More specifically, in one embodiment, the vehicle receives a signal from the key fob or the keypad to unlock or start the vehicle, as indicated by step 204. In one example embodiment, the command signal is to unlock the vehicle. It should be appreciated that the command signal may be received from a key fob or a keypad on the vehicle door handle. A key fob and a keypad include various input devices including a lock/unlock input device, and an engine start input device. The vehicle input devices, can be any type of input device, including, but not limited to, buttons or push buttons, sliders, switches, knobs, dials, and/or touch input devices.

Turning back to FIG. 2, in this example embodiment, before the vehicle determines whether to respond to this command signal (i.e., to unlock the car) as in standard PEPS operation mode or ignore the command signal as in restricted PEPS operation mode, the vehicle must determines whether the vehicle body control module received an activation command, as indicated by decision diamond 206. The activation command is a command from the user of the vehicle to activate the passive entry disabling feature.

In certain embodiments the activation command is a unique sequence from a separate button on the key fob. In another embodiment, the activation command is a unique code, such as for example "5+6" held down for two minutes. More specifically, in various embodiments, at least some vehicle functions are performed upon receiving a single user input at the vehicle input device for controlling said vehicle function, while other vehicle functions may be performed upon receiving a certain sequence or combination of inputs at one or more of the vehicle input devices. These combinational inputs can include, for example, sequential operation of two or more vehicle input devices and/or repeated operation of a single vehicle input device, such as, e.g., double-clicking the input device or holding down the input device for a preset time period. For example, in one embodiment of the present disclosure, an input device is clicked once for drivers side unlock and is clicked twice (i.e., double-clicked) or held down to unlock all of the doors of the vehicle. In certain embodiments, the activation command may be configured to a factory setting. In other alternative embodiments, the activation command may be modifiable by a user.

If the vehicle body control module does not receive the activation command, the vehicle continues in standard PEPS operation mode, as indicated by step 208. As such, in this example embodiment, in response to the unlock command signal from the key fob, the vehicle body control module unlocks the vehicle.

Under standard PEPS operation mode, upon receiving the advanced notification, the vehicle searches for the key fob or keypad. More specifically, the user's command is transmitted to a vehicle body control module 404 (as depicted in FIG. 4) to begin sweeping for the key fob or keypad. In one embodiment, the vehicle sweeps for a signal from the key fob with a low-power antenna located with a range of only a couple meters from the vehicle. If the antenna detects a signal from the key fob, the antenna authenticates that the key fob or keypad signal by verifying that the detected key fob or keypad is the key fob or keypad associated with the vehicle. If the signal is authenticated, the vehicle body control module completes the command. In this example embodiment, the body control module unlocks the doors.

On the other hand, if the vehicle body control module receives the valid activation command, the vehicle switches to the restricted PEPS operation mode, as indicated by step 210. In this example embodiment, if the vehicle receives an unlock command from the key fob and the vehicle receives an activation command, in the restricted PEPS operation mode, the vehicle ignores the received unlock command signal. That is, the vehicle body control does not send low frequency queries throughout the various antennas along the vehicle body. Such a configuration, enables the user to disable the PEPS system on-demand to block any unauthorized entry.

FIG. 3 illustrates a process 300 for deactivation of the passive entry disabling feature. Process 300 starts at step 302 where the passive entry disabling feature is already activated and the vehicle is already in restricted PEPS operation mode.

In this example embodiment, the vehicle receives a command from the key fob or keypad, as indicated by block 304. In this example embodiment, the vehicle receives another unlock command from the key fob. The vehicle then determines if the vehicle body control module receives a deactivation command, at decision diamond 306.

If the vehicle body control module does not receive a deactivation command, the vehicle body control module remains in restricted PEPS operational mode. As such, the vehicle body control module ignores the command received from the key fob or keypad, as indicated by step 308.

If, on the other hand, the vehicle body control module receives the deactivation command, the vehicle control manager switches back to standard PEPS operation mode, as indicated by step 310. Such a configuration enables an authorized user to deactivate the passive entry disabling system and return to standard PEPS operation when the user wishes to utilize the PEPS capabilities.

It should be appreciated that although the example embodiments described above describe an unlock command signal received from a key fob, the same process applies to a command for passive start of the vehicle.

It should be appreciated that in the embodiments described with respect to FIGS. 2-3, the passive entry disabling system and method are set to on-demand, or manual mode. That is, the user sets the vehicle PEPS system to manually be switched from standard operation mode to restricted mode. In this embodiment, the vehicle accepts the activation command from either the key fob or the door keypad and an ECU such as the body control module verifies the activation command prior to switching to restricted PEPS operation mode. The user may send the key or activation command as the user sees fit. By the same token, the vehicle accepts a valid key or deactivation command from either the key fob or the keypad to switch from restricted PEPS operation mode back to standard PEPS operation mode. As such, if the passive entry disabling feature is configured for on-demand, the entry/start commands will be rejected immediately after the controller received a valid activation command. Successful unlock command sent by either the key fob or keypad will enable both Passive Entry and Passive Start. Such a configuration prevents unwanted activation of the passive entry disabling feature and also provides an extra authentication measure for added safety benefits.

In certain embodiments, the passive entry disabling system and method may also be configured to automatically operate in the restricted mode. In one example embodiment, the vehicle automatically operates in restricted mode after the vehicle is locked. In an alternative embodiment, the user is able to select a delay feature so that the vehicle operates in the restricted mode during certain predetermined times. For example, the user may indicate that the vehicle operate in restricted PEPS mode ten minutes after the vehicle has been locked. In this embodiment, the user must disable the restricted mode prior to reentering the vehicle.

It should be appreciated, that when the passive entry disabling feature is configured to initiate automatically, the passive entry disabling feature does not require any activation or deactivation command. As soon as the vehicle receives the entry/start command, the vehicle is already in restricted PEPS operation mode. Thus, the vehicle will automatically ignore any entry/start signals.

The user may cancel the restricted PEPS operation mode through the vehicle HMI and the vehicle resumes standard operation. More specifically, the user may select the passive entry disabling feature from the menu on the HMI and select to disable it. The user may deactivate the passive entry disabling feature until the next ignition cycle.

In another embodiment, the current unlock command in both the key fob and keypad can be used to disable the feature. More specifically, in this embodiment, the vehicle detects the key fob when the key fob is within a three meter range. Once the vehicle detects the key fob, the vehicle body control module resume standard PEPS operation.

Referring now to FIG. 4, which illustrates an example vehicle computing system (VCS) 400 that may be included in a vehicle implementing the system and method of the present disclosure. The VCS 400 includes various electronic control units (ECUs) that are responsible for monitoring and controlling the electrical systems or subsystems of the vehicle, as described in more detail below. In embodiments, the ECUs of the VCS 400 are interconnected by a vehicle bus 402 (such as, e.g., a controller area network (CAN) bus) for passing data to and from the various ECUs, as well as other vehicle and/or auxiliary components in communication with the VCS 400. Each ECU may include, for example, one or more inputs and outputs for gathering, receiving, and/or transmitting data, a memory for storing the data, and a processor for processing the data and/or generating new information based thereon.

In the illustrated embodiment, the VCS 400 includes a body control module (BCM) 404 for controlling and monitoring various electronic accessories in a body of the vehicle. In various embodiments, the BCM 404 is an ECU that controls, among other vehicle components, the trunk and doors of the vehicle, including locking, unlocking, opening, and/or closing said doors. The BCM 404 can be configured to implement vehicle commands received from the key fob or keypad that are related to the doors, windows, or other body components controlled by the BCM 404.

As shown in FIG. 4, the VCS 400 can further include a powertrain control module (PCM) 406 for controlling and monitoring the engine and transmission of the vehicle. In some embodiments, the PCM 406 can be separated into two separate ECUs, specifically an engine control unit and a transmission control unit. In either case, the PCM 406 can be configured to control starting and stopping of the engine of the vehicle, including receiving commands to start the engine from the key fob or keypad.

As shown in FIG. 4, the VCS 400 further includes a telematics control unit (TCU) 408, which is an ECU for enabling the vehicle to connect to various wireless networks, including, for example, GPS, WiFi, cellular, Bluetooth, NFC, RFID, satellite, and/or infrared. In embodiments, the TCU 408 (also referred to as a "vehicle telematics unit") includes a wireless communication module 410 comprising one or more antennas, radios, modems, receivers, and/or transmitters (not shown) for connecting to the various wireless networks. For example, the wireless communication module 410 can include a mobile communication unit (not shown) for wirelessly communicating over a cellular network (e.g., GSM, GPRS, LTE, 3G, 4G, CDMA, etc.), an 802.11 network (e.g., WiFi), a WiMax network, and/or a satellite network. The TCU 408 can also be configured to control tracking of the vehicle using latitude and longitude values obtained from a GPS satellite.

In embodiments, the TCU 408 receives external data, including vehicle commands, via the wireless communication module 410 and provides the external data to an appropriate ECU of the VCS 400. For example, if the TCU 408 receives a lock door command, the TCU 408 sends the command to the BCM 404 via the vehicle bus 402. Likewise, if the TCU 408 receives a start engine command, the TCU 408 sends the command to the PCM 406 via the vehicle bus 402. In some embodiments, the TCU 408 also receives internal data from other ECUs of the VCS 400, or a processor (not shown) of the VCS 400, with instructions to transmit the internal data to the remote server 112, or another component of the passive entry disabling system and method of the present disclosure.

The wireless communication module 410 can be capable of wirelessly communicating over two or more networks to ensure continuity of network access, for example, in case one of the networks fail or are out of range. Moreover, the vehicle commands may be received at different receivers of the wireless communication module 410 depending on the wireless communication technology being used to transmit the command. For example, commands and/or data transmitted by the key fob or keypad to the vehicle may be received at a Bluetooth receiver (not shown) of the wireless communication module 410. As another example, commands and/or data transmitted by the remote server 112 to the vehicle may be received at a cellular or WiFi receiver (not shown) of the wireless communication module 410. Likewise, data may be transmitted from the TCU 408 to the key fob or keypad using a Bluetooth transmitter (not shown) included in the wireless communication module 410, and data may be transmitted from the TCU 408 to the remote server 112 using a cellular or WiFi transmitter (not shown) included in the wireless communication module 410. In embodiments, the VCS 400 may be transparent to the source of, or the transmission path used to send, the vehicle command to the vehicle. For example, the VCS 400 may treat vehicle commands received directly from the key fob or keypad no differently than vehicle commands received via the transmission path 115.

The VCS 400 can further include a remote keyless system (RKS) unit 412 for controlling and monitoring remote, keyless interactions between the key fob or keypad and the vehicle. The RKS unit 412 can include a remote keyless entry system and in some cases, a remote keyless ignition system. In the latter case, the RKS unit 412 may also be referred to as a "passive entry passive start (PEPS) system." In some embodiments, the RKS unit 412 is a separate, stand-alone ECU that is interconnected to the BCM 404, PCM 406, TCU 408, and other ECUs 414 of the vehicle via the vehicle bus 402 in order to carry out the RKS/PEPS operations. For example, the RKS unit 412 may receive vehicle commands from the key fob or keypad via the TCU 408, process the commands to identify the appropriate ECU for carrying out the command, send the command to the identified ECU, and confirm performance of the command. In other embodiments, the RKS unit 412 may be comprised of multiple segments that are incorporated into various ECUs of the VCS 400, such as, for example, the BCM 404, the PCM 406, and/or the TCU 408, to process the RKS/PEPS commands received at each ECU. In still other embodiments, the RKS unit 412 may be included within one ECU, such as, e.g., the TCU 408, in order to handle or process RKS/PEPS commands as they are received by the wireless communication module 410 of the TCU 408.

Referring to FIG. 5, shown is an example computing device 500 for processing data or other inputs associated with the passive entry disabling system and method of the present disclosure, for housing and executing software used to facilitate the processes 100, 200, and/or 300 for communicating with other components of the PEPS system, in accordance with embodiments. One or more instances of the computing device 500 may be utilized to implement any, some, or all of the components in the passive entry disabling system and method of the present disclosure. In some embodiments, portions of the passive entry disabling system and method of the present disclosure are implemented in software, as an executable program, and are executed by one or more special or general purpose digital computer(s), such as a mainframe computer, personal computer (desktop, laptop, or tablet-type computer), personal digital assistant, workstation, minicomputer, computer network, virtual network, Internet cloud computing facility, mobile telephone or smartphone, tablet, or other handheld computing device. In such cases, the computing device 200 may be representative of any computer in which the passive entry disabling system and method of the present disclosure resides or partially resides.

As an example, the computing device 500 may represent a computer included in the key fob or keypad for receiving vehicle command inputs and communicate with the vehicle and/or the mobile device 108. Likewise, the computing device 500 may represent a computer included in the mobile device 108 for storing, executing, and displaying the vehicle application 110, and communicating with the key fob or keypad and the remote server 112. As another example, the computing device 500 may represent a computer included in the remote server 112 for interfacing with the mobile device 108 and communicating vehicle commands to the vehicle. Further, the computing device 500 may represent a computer included in the VCS 114 of the vehicle for communicating with the key fob or keypad and the remote server 112, as well as receiving, processing, and executing vehicle commands received therefrom.

As shown in FIG. 5, the computing device 500 generally includes a processor 502, a memory 504, and one or more input and/or output (I/O) devices 506 (or peripherals) that are communicatively coupled via a local interface 508. The processor 502 is a hardware device and can be any custom made or commercially available processor, a central processing unit (CPU), an auxiliary processor among several processors associated with the computer 500, a semiconductor based microprocessor (in the form of a microchip or chip set), another type of microprocessor, or generally any device for executing software instructions. When the computing device 500 is in operation, the processor 502 can be configured to execute software stored within the memory 504, to communicate data to and from the memory 504, and to generally control operations of the computing device 500 pursuant to the software. The software, in whole or in part, but typically the latter, may be read by the processor 502, buffered within the processor 502, and then executed.

The memory 504 may include a computer readable medium for storing software for implementing the passive entry disabling system and method of the present disclosure, and/or components thereof, and for implementing particular system transactions. For example, the memory 504 may be configured to store one or more separate programs (e.g., source program, executable program (object code), or script) comprising ordered listings of executable instructions for implementing logical functions associated with the passive entry disabling system and method of the present disclosure. Furthermore, the software can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, Python, and Lua. Components of the passive entry disabling system and method of the present disclosure may also be written in a proprietary language developed to interact with these known languages.

In the context of this document, a "computer-readable medium" may be any means that can store, communicate, propagate, or transport data objects for use by or in connection with the wireless passive entry disabling system and method of the present disclosure, and can even include paper having programming instructions printed thereon.

In some cases, the software in the memory 504 includes one or more applications 510 that are associated with the passive entry disabling system and method of the present disclosure and configured to implement the transmission path 115. As an example, in the memory 504 of the mobile device 108, the application(s) 510 can include all or a portion of the vehicle application 110. As another example, in the memory 504 of the key fob or keypad, the application(s) 510 include a mobile link application for implementing the method 500, or otherwise detect user-selection of the mobile link button 116 and send vehicle commands received thereafter to the mobile device 108. In some cases, the memory 504 of the key fob or keypad can also store one or more security codes 512 that are uniquely associated with the vehicle and enable the key fob or keypad to remotely command certain vehicle operations. In yet another example, in the memory 504 of the server 112, the application(s) 510 include software designed to interface with the mobile device 108 and provide received vehicle commands to the telematics control unit (TCU) 408, or the VCS 114/400, of the vehicle. The memory 504 of the server 112 can also be utilized to implement one or more databases, such as, for example, a vehicle database 514 configured to store information associated with the vehicle, including for example, diagnostic information received from the TCU 408, GPS information received from a GPS satellite and associated with the vehicle, user account information related to the vehicle application 110, and the like.

In embodiments, the memory 504 includes any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 504 may incorporate electronic, magnetic, optical, and/or other types of storage media. In some cases, the memory 504 can have a distributed architecture where various components are situated remote from one another, but are still accessed by the processor 502.

The local interface 508 may be, for example, but is not limited to, one or more buses or other wired or wireless connections, as is known in the art. The local interface 508 may have additional elements, which are omitted for simplicity, such as controllers, buffers (caches), drivers, repeaters, and receivers, to enable communications. Further, the local interface 508 may include address, control, and/or data connections to enable appropriate communications among the other computer components.

The I/O devices 506 may include interactive hardware that is internal to the computing device 500, or external and connected wirelessly or via connection cable and/or I/O ports. The I/O devices 506 can include input devices 516, for example but not limited to, input modules for programmable logic controllers (PLCs), a keyboard, mouse, scanner, microphone, touchscreens, stylus, radio-frequency device readers, input hardware (e.g., buttons, switches, sliders, knobs, dials, and the like; such as, for example, the vehicle input devices 106 and the mobile input device 116), etc. Furthermore, the I/O devices 506 may also include output devices 518, for example but not limited to, output modules for PLCs, displays, haptic devices (e.g., actuators), lights (e.g., LEDs; such as, for example, the output devices 117), audio output devices (e.g., speakers), etc.

The I/O devices 506 further comprise devices that communicate with both inputs and outputs, including, but not limited to, a wireless communication module 520. The wireless communication module 520 includes one or more antennas 522 configured to wireless transmit signals to, and/or receive signals from, at least other components of the passive entry disabling system and method of the present disclosure. The wireless communication module 520 further includes one or more receivers, transmitters, and/or transceivers (not shown) that are communicatively coupled to the one or more antennas 522 for processing the received signals, providing the transmitted signals, or otherwise facilitating wireless communication with other components of the passive entry disabling system and method of the present disclosure. The wireless communication module 520 may also include a modulator/demodulator (modem; for accessing another device, system, or network, such as, e.g., another component within the passive entry disabling system and method of the present disclosure), a bridge, and/or a router.

The exact type of wireless communication technology included in the wireless communication module 520 can vary depending on the computing device 500 and may include at least one of short-range wireless communication technology (such as, e.g., radio frequency (RF), Bluetooth, infrared, and/or NFC technology) and longer-range or broadband wireless communication technology (such as, e.g., WiFi, WiMax, other wireless Ethernet, cellular, GPS, and/or satellite technology). In some cases, the wireless communication module 520 may include more than one antenna and corresponding transceiver in order to communicate over different wireless networks. For example, the mobile device 102 may use Bluetooth technology to communicate with the key fob or keypad and WiFi and/or cellular technology to communicate with the remote server 112.

In some cases, the computing device 500 can also include hardware for implementing one or more aspects of the techniques described herein. In such cases, the hardware utilizes any of the following technologies, or a combination thereof, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
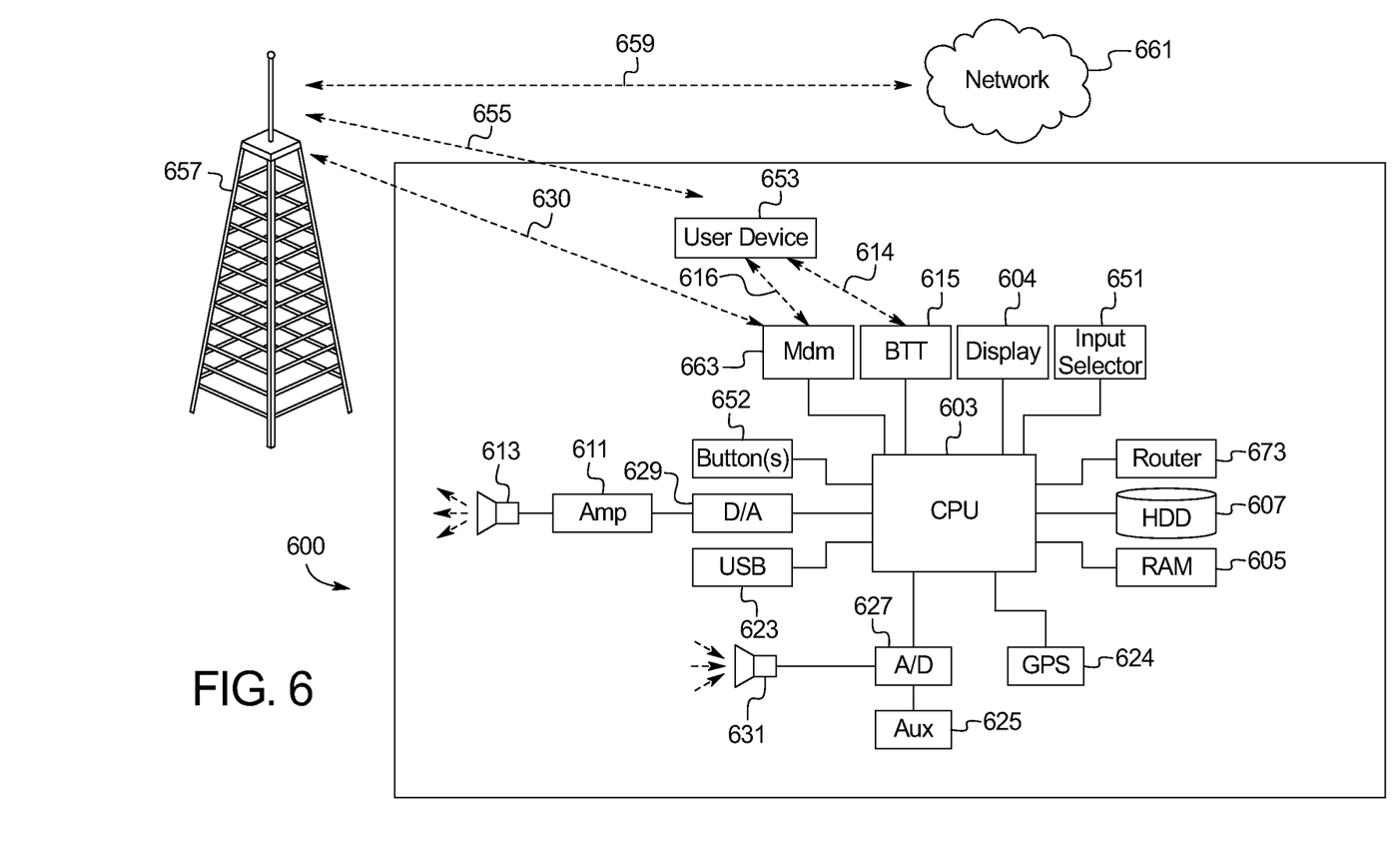
FIG. 6 is a block diagram of an example of a vehicle-based computing system of the present disclosure according to certain embodiments.

FIG. 6 is a block diagram of the vehicle's infotainment system 600, which is a vehicle-based computing system. One example of an infotainment system is the SYNC® system manufactured by the FORD MOTOR COMPANY® (SYNC® and FORD MOTOR COMPANY® are registered trademarks of the Ford Motor Company). Other embodiments of the infotainment system may include different, fewer, or additional components than those described below and shown in FIG. 4.

In this example embodiment, the infotainment system 600 includes: (1) a processor 603; (2) a display 604; (3) a non-persistent memory device 605; (4) a persistent memory device 607; (5) an amplifier 611; (6) a speaker 613; (7) a BLUETOOTH® transceiver 615 (BLUETOOTH® is a registered trademark of Bluetooth SIG, Inc.); (8) a modem 663; (9) a USB port 623; (10) a GPS device 624; (11) an auxiliary input 625; (12) an analog-to-digital converter 627; (13) a digital-to-analog converter 629; (14) a microphone 631; (15) an input selector 651; (16) one or more buttons 652; and (17)

a vehicle-based wireless router 673 having a WiFi transceiver (not shown). Although not shown, certain components of the infotainment system 600 may use a vehicle network (such as but not limited to a controller area network (CAN bus)) to pass data to and from one another and to other vehicle components.

The processor 603 at least partially controls operation of the different components of the infotainment system 600. The processor 603 enables processing of commands and routines onboard the vehicle. The processor 603 may be any suitable processing device or set of processing devices, such as but not limited to a microprocessor, a microcontroller-based platform, a suitable integrated circuit, or one or more application-specific integrated circuits (ASICs) connected to and configured to execute a set of instructions stored on one of the memory devices 605 and 607. The instructions may include software for operating the infotainment system 600.

In this example embodiment, the non-persistent memory device 605 is random access memory (RAM), which may include non-volatile RAM, magnetic RAM, ferroelectric RAM, and any other suitable forms. The persistent memory device 607 is a hard disk drive (HDD) or any other suitable memory, such as but not limited to flash memory, an EPROM, an EEPROM, a memristor-based non-volatile solid-state memory, unalterable memory, or read-only memory.

The infotainment system 600 includes a variety of different input devices that enable a user to provide an input to the infotainment system 600. Here, the input devices include the USB port 623, the auxiliary input 625, the microphone 631, and the buttons 652. Other input devices may include but are not limited to one or more control knobs, an instrument panel, a keyboard, a scanner, a digital camera for image capture and/or visual command recognition, a touch screen, a mouse, or a touchpad.

The USB port 623 is configured to receive a USB interface to enable communication between a remote device connected to the USB interface and the infotainment system 600. For instance, the USB port 623 can receive a USB interface of or connected to a portable hard drive (i.e., a computer-readable medium) to enable data stored on the portable hard drive to be uploaded to the persistent memory 607 of the infotainment system 600.

The auxiliary input 625 is configured to receive a wireless or wired input from an auxiliary device, such as a personal media player, a wireless health device, or a portable computing device. The auxiliary input 625 passes the input as an analog signal to the analog-to-digital converter 627. The analog-to-digital converter 627 converts the analog signal into a digital signal before passing the digital signal to the processor 603.

The microphone 631 is configured to receive sound (e.g., a user's speech), which it passes as an analog signal to the analog-to-digital converter 627. The analog-to-digital converter 627 converts the analog signal into a digital signal before passing the digital signal to the processor 603.

The buttons 652 may be any suitable buttons, such as but not limited to hard keys, soft keys, and virtual keys displayed on a display that are actuatable by a user to provide input to the infotainment system 600.

The input selector 651 is manipulatable to enable the user to choose how the user desires to provide an input to the infotainment system 600 by switching between various input options. For example, the user could manipulate the input selector 651 to activate the microphone 631 to enable the user to provide a speech command to the infotainment system 600 or to initiate pairing of the user device 653 and the infotainment system 600.

The infotainment system 600 includes a variety of different output devices configured to output information observable by the user. Here, the output devices include the display 604 and the speaker 613, though the infotainment system 600 may include any other suitable output devices. The display 604 may be any suitable display device, such as but not limited to an LCD, an OLED, a flat panel display, a solid state display, a cathode ray tube (CRT), or a heads-up display. The speaker 613 may be any suitable speaker or other stereo system component configured to output audio. Specifically, the processor 603 passes a digital signal to the digital-to-analog converter 609. The digital-to-analog converter 609 converts the digital signal to an analog signal, which it passes to the speaker 613. The speaker 613 outputs the analog signal as audio.

The infotainment system 600 includes a variety of different communication interfaces, each of which includes a wired and/or a wireless interface to enable communication between the infotainment system 600 and one or more remote devices, such as but not limited to a user device 653 (e.g., a cell phone, a smart phone, a personal digital assistant, or a laptop computer); a cellular tower 357; or a WiFi access point (not shown). Here, the communication interfaces include the BLUETOOTH® transceiver 615, the modem 663, the GPS device 624, and the router 673, though the infotainment system 600 may include any other suitable communication interfaces.

The BLUETOOTH® transceiver 615 enables the infotainment system 600 to pair with the user device 653 so the user device 653 and the infotainment system 600 can communicate with each other. Specifically, the BLUETOOTH® transceiver 615 can pair with a BLUETOOTH® transceiver (not shown) of the user device 653 (as is known in the art). Once paired, the infotainment system 600 and the user device 653 can communicate with one another, represented by signal 614. In certain embodiments, the BLUETOOTH® transceiver 615 initiates the pairing, such as following receipt of an input from the user or automatically after recognizing the BLUETOOTH® transceiver of the user device 653 is within a suitable range. In other embodiments, the BLUETOOTH® transceiver of the user device 653 initiates the pairing, such as following receipt of an input from the user or automatically after recognizing the BLUETOOTH® transceiver 615 of the infotainment system 600 is within a suitable range.

Once the infotainment system 600 and the user device 653 are paired, the infotainment system 600 can communicate through the user device 653 with an external network 661. For example, the user device 653 can communicate with the external network 661 via the cellular tower 357 (or a WiFi access point), represented by signals 655 and 659. When the user device 653 is paired with the infotainment system 600, the infotainment system 600 can communicate with the external network 661 via its ability to communicate with the user device 653, as represented by signal 616. Once paired, the infotainment system 600 and the external network 661 may communicate in any suitable manner, such as but not limited to by using a data plan, data over voice, or dual tone multi frequency tones.

In certain embodiments, the processor 603 runs an operating system including an application program interface (API) to communicate with application software. The application software may access an embedded module or firmware on the BLUETOOTH® transceiver 615 to enable wireless communication between the BLUETOOTH® transceiver 615 and the BLUETOOTH® transceiver of the user device 653. BLUETOOTH® is a subset of the IEEE 802 personal area network (PAN) protocols. IEEE 802 local area network (LAN) protocols include WiFi and have considerable cross-functionality with IEEE 802 PAN. Both are suitable for wireless communication within a vehicle. Other communication methods that can be used are free-space optical communication (such as infrared data association) and non-standardized consumer infrared protocols.

The external network 661 may be a collection of one or more networks, including standards-based networks (e.g., 2G, 3G, 4G, Universal Mobile Telecommunications System (UMTS), Global System for Mobile Communications (GSM), Long Term Evolution (LTE), and the like); WiMAX; BLUETOOTH®; near field communication (NFC); WiFi (including 802.11 a/b/g/n/ac or others); WiGig; Global Positioning System (GPS) networks; and the like. Further, the external network 661 may be a public network, such as the Internet; a private network, such as an intranet; or combinations thereof, and may utilize a variety of networking protocols now available or later developed including, but not limited to, TCP/IP-based networking protocols.

The modem 663 enables the infotainment system 600 to communicate with the external network 661. In various embodiments, the modem 663 enables the infotainment system 600 to communicate with the external network 661 via the user device 653. For example, the user device 653 can communicate with the external network 661 via the cellular tower 357 (or a WiFi access point), represented by signals 655 and 659. When the user device 653 is connected to the modem 663, the infotainment system 600 can communicate with the external network 661 via its ability to communicate with the user device 653 over the voice band, as represented by signal 616. In other embodiments, the modem 663 enables the infotainment system 600 to communicate with the external network 661 by bypassing the user device 653 and directly communicating with the cellular tower 357 (or a WiFi access point), represented by signals 630 and 659.

In other embodiments, the user device 653 includes a modem for voice band or broadband data communication. In the data-over-voice embodiment, a technique known as frequency division multiplexing may be implemented when the user of the user device 653 can talk over the user device 653 while data is being transferred. At other times, when the user is not using the user device 653, the data transfer can use the whole bandwidth (600 Hz to 3.4 kHz in one example). While frequency division multiplexing may be common for analog cellular communication between the vehicle and the Internet, and is still used, it has been largely replaced by hybrids of with Code Domian Multiple Access (CDMA), Time Domain Multiple Access (TDMA), or Space-Domian Multiple Access (SDMA) for digital cellular communication. These are all ITU IMT-2000 (3G) compliant standards, and offer data rates up to 2 Mbit/s for stationary or walking users and 385 kbit/s for users in a moving vehicle. 3G standards are now being replaced by IMT-Advanced (4G) which offers 100 Mbit/s for users in a vehicle and 1 Gbit/s for stationary users. If the user has a data-plan associated with the user device 653, the data-plan may allow for broadband transmission and the infotainment system 600 could use a much wider bandwidth (speeding up data transfer). In still another embodiment, the user device 653 is replaced with a cellular communication device (not shown) that is installed in the vehicle itself.

The GPS device 624 may include a GPS receiver and a GPS antenna (not shown) configured to communicate with one or more satellites to enable determination of the vehicle's location.

The vehicle-based wireless router 673 and WiFi transceiver enable the infotainment system 600 to directly connect to a WiFi network (not shown).

In addition to having exemplary processes executed by the infotainment system, in certain embodiments, the exemplary processes may be executed by a computing system in communication with the infotainment system 600. This computing system may include, but is not limited to, a wireless device (e.g., a mobile phone) or a remote computing system (e.g., a server) connected through the wireless device. Collectively, such systems may be referred to as vehicle associated computing systems (VACS). In certain embodiments, particular components of the VACS may perform particular portions of a process depending on the particular implementation of the system. For example, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the infotainment system located within the vehicle itself is capable of performing the exemplary processes.

In certain embodiments, the process descriptions or blocks in the figures, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:
1. A passive entry disabling system, comprising:
a human to machine interface configured to:
verify a valid key prior to enabling a restricted passive entry passive start operation mode; and
output instructions for activation of the restricted passive entry passive start operation mode; and
a vehicle body control module configured to:
receive a vehicle command signal; and
ignore the vehicle command signal when the restricted passive entry passive start operation mode is activated.
2. The passive entry disabling system of claim 1, wherein the vehicle command signal includes an unlock signal.
3. The passive entry disabling system of claim 1, wherein the vehicle command signal includes an engine start signal.

4. The passive entry disabling system of claim 1, wherein the vehicle is in standard passive entry passive start operation mode when the vehicle is not in restricted passive entry passive start operation mode.

5. The passive entry disabling system of claim 2, wherein the vehicle body control module is further configured to respond to the vehicle command signal when the vehicle is in standard passive entry passive start operation mode.

6. The passive entry disabling system of claim 1, wherein a separate input on a passive key is configured to send, to the vehicle body control module, a request to enable the restricted passive entry passive start operation mode.

7. The passive entry disabling system of claim 6, wherein the separate input includes a combination of buttons.

8. The passive entry disabling system of claim 1, wherein the vehicle body control module is further configured to activate the restricted passive entry passive start operation mode if the vehicle body control module:
receives a valid key to enable the restricted passive entry passive start operation mode; and
receives an activation command from a user.

9. The passive entry disabling system of claim 8, wherein the activation command is sent via a separate input device on a passive key.

10. The passive entry disabling system of claim 7, wherein the activation command is sent via a combination of buttons of a passive key.

11. A passive entry disabling method comprising:
verifying, at a human to machine interface, a valid key to enable a restricted passive entry passive start operation mode;
outputting activation instructions on the human to machine interface;
receiving, at a body control module, a vehicle command signal; and
receiving, at the body control module, an activation command that causes the body control module to ignore the received vehicle command signal.

12. The passive entry disabling method of claim 11, further comprising receiving, at the body control module, a deactivation command that causes the body control module to respond to the received vehicle command signal.

13. The passive entry disabling method of claim 11, wherein the vehicle command signal includes an unlock signal.

14. The passive entry disabling method of claim 11, wherein the vehicle command signal includes an engine start signal.

15. The passive entry disabling method of claim 11, wherein the vehicle is in standard passive entry passive start operation mode when the vehicle is not in restricted passive entry passive start operation mode.

16. The passive entry disabling method of claim 15, wherein the vehicle body control module is further configured to respond to the vehicle command signal when the vehicle is in standard passive entry passive start operation mode.

17. The passive entry disabling method of claim 11, wherein a separate input on a passive key is configured to send, to the vehicle body control module, a request to enable the restricted passive entry passive start operation mode.

18. The passive entry disabling method of claim 11, further including activating the restricted passive entry passive start operation mode if the vehicle body control module:
receives a valid key to enable the restricted passive entry passive start operation mode, and
receives an activation command from a user.

19. The passive entry disabling method of claim 18, wherein the activation command is sent via a separate input device on a passive key.

20. The passive entry disabling method of claim 18, wherein the activation command is sent via a combination of buttons of a passive key.

* * * * *